Patented July 12, 1949

2,476,170

UNITED STATES PATENT OFFICE 2,476,170

MANUFACTURE OF DIPHENYLAMINE

Alexander H. Widiger, Jr., Midland, Mich., assignor to The Dow Chemical Company, Midland, Mich., a corporation of Delaware No Drawing. Application July 16, 1945,
Serial No. 605,458

9 Claims. (Cl. 260—576)

This invention relates to an improved process for the manufacture of diphenylamine.

A known method for making diphenylamine involves the reaction of chlorobenzene with aniline in the presence of a solid alkali metal hydroxide, according to the equation $$C_6H_5Cl + C_6H_5NH_2 + MOH \rightarrow (C_6H_5)_2NH + MCl + H_2O$$

where M is an alkali metal. A cuprous compound may serve as catalyst, and the water liberated in the reaction is preferably distilled off continuously by means of a carrier liquid, as is described in British Specification 507,860. In this process, moderate yields have been realized when using powdered potassium hydroxide as the alkali, but this material is relatively costly and is troublesome to handle. Sodium hydroxide, while less expensive, is reactive only at high temperatures, and then slowly, so that heating requirements are excessive and equipment problems become serious. For these reasons, the manufacture of diphenylamine by the process described has never seemed industrially feasible.

It has now been found that the rate of reaction of chlorobenzene and aniline in the presence of sodium hydroxide, using a cuprous catalyst, may be materially increased by adding a small proportion of a potassium compound to the reaction mixture. With this addition, reaction temperatures and times may be lowered considerably; very acceptable yields of diphenylamine may be realized without experiencing undue heating and equipment problems and without incurring the expense and trouble occasioned by the use of powdered potassium hydroxide.

It has also been found, contrary to prior teaching, that the sodium hydroxide need not be added to the reaction mixture as a solid, but that equal and sometimes higher rates of reaction are realized when it is added as an aqueous solution.

These findings constitute the basis of the present invention, which provides a simple and practicable method for making diphenylamine on an industrial scale.

In carrying out the new process, chlorobenzene, aniline, cuprous oxide or a cuprous salt as catalyst, sodium hydroxide, and a small proportion of a potassium compound are charged into a closed vessel and heated to a reaction temperature, usually at least 200° C. The mixture is then stirred and the water formed by the reaction is removed continuously, as by allowing it to vaporize and withdrawing the vapors. Chlorobenzene simultaneously vaporized is condensed and returned to the mixture. When the reaction has proceeded to a satisfactory extent, ordinarily after not less than an hour, the mixture is removed from the vessel and treated to recover the diphenylamine.

The relative proportions of the reactants in the process may be varied widely, although it is highly preferable that both the chlorobenzene and the aniline be present in stoichiometric excess relative to the sodium hydroxide. Excess chlorobenzene functions as a carrier liquid in the removal of the water formed in the reaction, and excess aniline serves to minimize formation of tar. If desired, some carrier liquid other than the chlorobenzene reactant, e. g. xylene, may be added to assist in driving off the water of the reaction by azeotropic distillation.

While chlorobenzene and aniline will react according to the invention in the absence of a cuprous catalyst, best results are obtained by adding cuprous oxide or a cuprous salt, e. g. the iodide. Alternatively, the catalyst may be formed in situ by adding powdered copper or copper bronze to the reaction mixture. The catalyst should ordinarily be added in a proportion equivalent to from 0.001 to 0.010 gram-atom of copper per gram mol of sodium hydroxide.

The sodium hydroxide required in the reaction may be introduced as lumps, flakes, or powdered solid, or more conveniently as a concentrated aqueous solution, such as commercial 50 per cent caustic soda. When such a solution is added, the water in it vaporizes in the early stages of the heating step, leaving the sodium hydroxide in a very finely-divided and unusually reactive state.

In so far as is known, any potassium compound which is not adversely reactive with the other reactants and products will function satisfactorily to accelerate the formation of diphenylamine according to the invention. The simple ionizable inorganic potassium compounds, particularly the chloride, hydroxide, and carbonate, are most convenient. These need not be specially purified, but may be added in the form of crude mixtures with sodium chloride, hydroxide, or carbonate, such as are sometimes available as by-products of chemical industry. Only a small proportion of the potassium compound is required to obtain the accelerating effect, with a quantity equivalent to from 0.002 to 0.1 gram-atom of potassium per gram mol of sodium hydroxide being generally suitable, and with at least 0.01 gram-atom being preferred.

The reaction of the invention proceeds at temperatures above about 200° C., the rate increasing rather sharply with increase in temperature.

Temperatures of 240° C. up to slightly below the fusing temperature of sodium hydroxide (318° C.), say to 315° C., are preferred, with optimum rates of reaction being obtained near 300° C. At these temperatures, it is necessary to operate in a closed vessel under pressure to maintain the reaction mixture in the liquid state, the pressure being created by vaporization of a part of the reactants or by introducing, at the start of reaction, a compressed inert gas, such as nitrogen or air.

The process is conveniently carried out in a stirring autoclave provided with heating coils and a reflux condenser fitted with a water trap. The desired reaction temperature is maintained by supplying heat to the coils, and the pressure is regulated, by admitting or venting inert gas, to a value such that the chlorobenzene or other carrier liquid present boils gently. The vapor thus formed enters the condenser, taking with it the water formed by the reaction and any water added with the sodium hydroxide. This water is retained in the trap, and the condensed chlorobenzene is returned continuously to the reacting mixture.

Reaction as described is continued until the desired proportion of diphenylamine has been formed, usually for at least an hour, even at 300° C., and more commonly for from 2 to 10 hours. It is not essential that the reaction be carried strictly to completion; economic considerations may make it advantageous to withdraw the reaction mixture after a few hours, recover the diphenylamine, and return the unreacted materials for a second treatment.

The reaction mixture is worked up by diluting it with water to dissolve most of the inorganic substances present, filtering to remove solids, and allowing the filtrate to separate into two layers. The oily layer may then be subjected to fractional distillation, preferably at reduced pressure, the excess chlorobenzene and aniline and the diphenylamine product being recovered as separate fractions of the distillate, leaving a small proportion of residual tar.

The following examples will illustrate the invention, but are not to be construed as limiting its scope.

*Example 1*

The reactants were charged into a stirring autoclave in the following relative proportions:

| | Gram mols |
|---|---|
| Chlorobenzene | 10.0 |
| Aniline | 31.9 |
| Ground sodium hydroxide | 5.07 |
| Cuprous oxide | 0.06 |
| Potassium chloride | 0.06 |

The mixture was stirred vigorously and heated to a temperature of 235° to 240° C. and the pressure in the autoclave was regulated at from 40 to 46 pounds per square inch gage. Heating was continued under these conditions for 10.0 hours, water and chlorobenzene distilling off continuously, and the latter being returned to the mixture. On cooling the mixture and working up the products, there was obtained 2.73 gram mols of diphenylamine. Analysis showed that 60 per cent of the sodium hydroxide initially added had been consumed.

*Example 2*

The reactants were mixed as follows:

| | Gram mols |
|---|---|
| Chlorobenzene | 12.5 |
| Aniline | 27.4 |
| Sodium hydroxide (50 per cent aqueous solution) | 10.3 |
| Cuprous oxide | 0.06 |
| Potassium chloride | 0.80 |

Reaction was carried out for 3.0 hours at a temperature of 295° to 300° C. under a pressure which was decreased gradually from 150 to 95 pounds gage as the chlorobenzene was consumed. There was obtained 7.8 gram mols of diphenylamine.

What is claimed is:

1. In a process for making diphenylamine wherein chlorobenzene, aniline, and sodium hydroxide are heated together at a temperature of at least 200° C., the method of accelerating the reaction which comprises adding to the reaction mixture a small proportion of an ionizable inorganic potassium compound.

2. A process according to claim 1 wherein the potassium compound is potassium chloride.

3. A process according to claim 1 wherein the potassium compound is potassium hydroxide.

4. A process according to claim 1 wherein the potassium compound is potassium carbonate.

5. A process for making diphenylamine which comprises agitating in a closed vessel a mixture of sodium hydroxide, chlorobenzene and aniline both in stoichiometric excess relative to the hydroxide, a cuprous catalyst in the proportion corresponding to from 0.001 to 0.01 gram-atom of copper per gram mol of the hydroxide, and a stable ionizable potassium compound in a proportion corresponding to from 0.002 to 0.1 gram-atom of potassium per gram mol of the hydroxide, at a temperature of from 240° to 315° C. for a period of at least an hour while continuously removing from the reaction mixture the water liberated by the reaction, and thereafter recovering diphenylamine from the reaction mixture.

6. A process according to claim 5 wherein the potassium compound is potassium chloride.

7. A process according to claim 5 wherein the potassium compound is potassium hydroxide.

8. A process according to claim 5 wherein the potassium compound is potassium carbonate.

9. A process according to claim 5 wherein the sodium hydroxide is added as an aqueous solution.

ALEXANDER H. WIDIGER, JR.

REFERENCES CITED

The following references are of record in the file of this patent:

UNITED STATES PATENTS

| Number | Name | Date |
|---|---|---|
| 1,882,759 | Britton et al. | Oct. 18, 1932 |

FOREIGN PATENTS

| Number | Country | Date |
|---|---|---|
| 2,766 | Great Britain | 1907 |
| 507,860 | Great Britain | June 22, 1939 |

OTHER REFERENCES

Chem. Abst., vol. 23 (1929), p. 1627. (Copy in Patent Office Library.)